United States Patent
Yi et al.

(10) Patent No.: US 11,057,956 B2
(45) Date of Patent: Jul. 6, 2021

(54) APPARATUS AND METHOD FOR PERFORMING PACKET DUPLICATION

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/498,354

(22) PCT Filed: May 29, 2018

(86) PCT No.: PCT/KR2018/006072
§ 371 (c)(1),
(2) Date: Sep. 26, 2019

(87) PCT Pub. No.: WO2018/221926
PCT Pub. Date: Dec. 6, 2018

(65) Prior Publication Data
US 2020/0077459 A1      Mar. 5, 2020

Related U.S. Application Data

(60) Provisional application No. 62/514,016, filed on Jun. 2, 2017.

(51) Int. Cl.
| | |
|---|---|
| *H04W 76/15* | (2018.01) |
| *H04W 72/04* | (2009.01) |
| *H04W 28/02* | (2009.01) |
| *H04L 1/08* | (2006.01) |

(52) U.S. Cl.
CPC ............. *H04W 76/15* (2018.02); *H04L 1/08* (2013.01); *H04W 28/02* (2013.01); *H04W 72/048* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 8,605,674 B2 | 12/2013 | Park et al. | |
| 10,750,410 B2 * | 8/2020 | Vrzic | H04W 36/18 |
| 2018/0279168 A1 * | 9/2018 | Jheng | H04W 28/04 |
| 2018/0279229 A1 * | 9/2018 | Dinan | H04W 52/146 |

(Continued)

FOREIGN PATENT DOCUMENTS

WO     2016143560     9/2016

OTHER PUBLICATIONS

PCT International Application No. PCT/KR2018/006072, Notification of Transmittal of the International Search Report and the Written Opinion of the International Searching Authority, or Declaration dated Sep. 20, 2018, 11 pages.

(Continued)

*Primary Examiner* — Bunjob Jaroenchonwanit
(74) *Attorney, Agent, or Firm* — Lee Hong Degerman Kang Waimey

(57) ABSTRACT

The method for a user equipment (UE) performing packet duplication comprises receiving a duplication activation command for a duplicate radio bearer (RB); and applying the packet duplication for the duplicate RB if each of transmission paths of the duplicate RB is mapped to at least one activated cell.

8 Claims, 6 Drawing Sheets

(56) References Cited

U.S. PATENT DOCUMENTS

| | | | |
|---|---|---|---|
| 2018/0324641 A1* | 11/2018 | Tsai | H04L 69/321 |
| 2018/0332501 A1* | 11/2018 | Tseng | H04L 1/189 |
| 2019/0268799 A1* | 8/2019 | Hong | H04W 40/04 |
| 2020/0029379 A1* | 1/2020 | Xiao | H04L 1/22 |
| 2020/0092746 A1* | 3/2020 | Baek | H04W 28/06 |
| 2020/0162211 A1* | 5/2020 | Wang | H04W 72/0433 |
| 2020/0186292 A1* | 6/2020 | Zou | H04L 61/6022 |
| 2020/0196185 A1* | 6/2020 | Babaei | H04W 72/1284 |
| 2020/0196379 A1* | 6/2020 | Park | H04W 76/27 |
| 2020/0228438 A1* | 7/2020 | Loehr | H04W 28/04 |

OTHER PUBLICATIONS

Ericsson, "Dynamic reconfiguration of split bearer or duplication", 3GPP TSG RAN WG2 Meeting #98, R2-1704374, May 2017, 3 pages.

Huawei, et al., "Interaction between PDCP/RLC/MAC for packet duplication", 3GPP TSG RAN WG2 Meeting #98, R2-1704836, May 2017, 3 pages.

Huawei, et al., "UL handling for split SRB", 3GPP TSG RAN WG2 Meeting #98, R2-1705147, May 2017, 2 pages.

\* cited by examiner (a) Control-Plane Protocol Stack (b) User-Plane Protocol Stack

FIG. 4

| $C_7$ | $C_6$ | $C_5$ | $C_4$ | $C_3$ | $C_2$ | $C_1$ | R | Oct 1 |

FIG. 5

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

APPARATUS AND METHOD FOR PERFORMING PACKET DUPLICATION

CROSS-REFERENCE TO RELATED APPLICATIONS

This application is the National Stage filing under 35 U.S.C. 371 of International Application No. PCT/KR2018/006072, filed on May 29, 2018, which claims the benefit of U.S. Provisional Application No. 62/514,016, filed on Jun. 2, 2017, the contents of which are all hereby incorporated by reference herein in their entirety.

TECHNICAL FIELD

The present invention relates to wireless communication, and more particularly, to apparatus and method for performing packet duplication.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be reffered to as eNB and gNode B (gNB), etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer (L1) of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA)

scheme in downlink and is modulated using a single carrier frequency division multiple access (SC-FDMA) scheme in uplink.

The MAC layer (L2) of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

In the development to a New Radio Access Technology (NR), NR system should be able to use frequency bands up to 100 GHz. In NR, random access (RA) procedure may be an essential procedure for all UEs when establishing an RRC Connection or scheduling, increased latency. It is not desirable that random access preamble collision between UEs is not desirable. Therefore, a new method is required in supporting RA procedure with NR system.

DISCLOSURE

Technical Problem

An object of the present invention devised to solve the problem lies in method for a user equipment (UE) performing packet duplication.

Another object of the present invention is to provide a user equipment (UE) for performing packet duplication.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for a user equipment (UE) performing packet duplication comprising: receiving a duplication activation command for a duplicate radio bearer (RB); and applying the packet duplication for the duplicate RB if each of transmission paths of the duplicate RB is mapped to at least one activated cell.

If all cells belonging to one transmission path of the duplicate RB are deactivated, the UE does not apply the packet duplication for the duplicate RB. The method further comprises submitting, by a Packet Data Convergence Protocol (PDCP) entity of the duplicate RB, a PDCP PDU to only a specific RLC entity associated with an activated cell mapped to the duplicate RB.

The applying comprises duplicating, by a Packet Data Convergence Protocol (PDCP) entity of the duplicate RB, a PDCP Protocol Data Unit (PDCP PDU); and submitting, by the PDCP entity of the duplicate RB, the duplicated PDCP PDU to at least two Radio Link Control (RLC) entities associated with at least one activated cell mapped to the duplicate RB.

The method further comprises stopping the packet duplication for the duplicate RB if all cells mapped to one transmission path of the duplicate RB become deactivated.

The duplicate RB is associated with a Packet Data Convergence Protocol (PDCP) entity and two RLC entities.

In another aspect of the present invention can be achieved by providing a method for a user equipment (UE) performing packet duplication comprising performing the packet duplication for a duplicate radio bearer (RB); and stopping the packet duplication for the duplicate RB if all cells mapped to one transmission path of the duplicate RB become deactivated. The packet duplication for the duplicate RB is performed if each of transmission paths of the duplicate RB is mapped to at least one activated cell.

In another aspect of the present invention can be achieved by providing a user equipment (UE) performing packet duplication comprising: a receiver configured to receive a duplication activation command for a duplicate radio bearer (RB); and a processor configured to apply the packet duplication for the duplicate RB if each of transmission paths of the duplicate RB is mapped to at least one activated cell.

If all cells belonging to one transmission path of the duplicate RB are deactivated, the processor is configured not to apply the packet duplication for the duplicate RB.

For the applying, the processor is configured to control: duplicate, by a Packet Data Convergence Protocol (PDCP) entity of the duplicate RB, a PDCP Protocol Data Unit (PDCP PDU); and submit, by the PDCP entity of the duplicate RB, the duplicated PDCP PDU to at least two Radio Link Control (RLC) entities associated with at least one activated cell mapped to the duplicate RB.

The processor is configured to control a Packet Data Convergence Protocol (PDCP) entity of the duplicate RB to submit a PDCP PDU to only a specific RLC entity associated with an activated cell mapped to the duplicate RB.

The processor is configured to stop the packet duplication for the duplicate RB if all cells mapped to one transmission path of the duplicate RB become deactivated.

In another aspect of the present invention can be achieved by providing a user equipment (UE) performing packet duplication comprising: a processor configured to perform the packet duplication for a duplicate radio bearer (RB); and stop the packet duplication for the duplicate RB if all cells mapped to one transmission path of the duplicate RB become deactivated. The processor is configured to perform the packet duplication for the duplicate RB if each of transmission paths of the duplicate RB is mapped to at least one activated cell.

Advantageous Effects

According to an embodiment of the present application, the UE can apply packet duplication depending on cell activation status.

It will be appreciated by those skilled in the art that the effects that can be achieved through the embodiments of the present disclosure are not limited to those described above and other effects of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 4 is a diagram illustrating Activation/Deactivation MAC control element of one octet.

FIG. 5 is a diagram illustrating Activation/Deactivation MAC control element of four octets.

MODE FOR INVENTION

Figure 1:
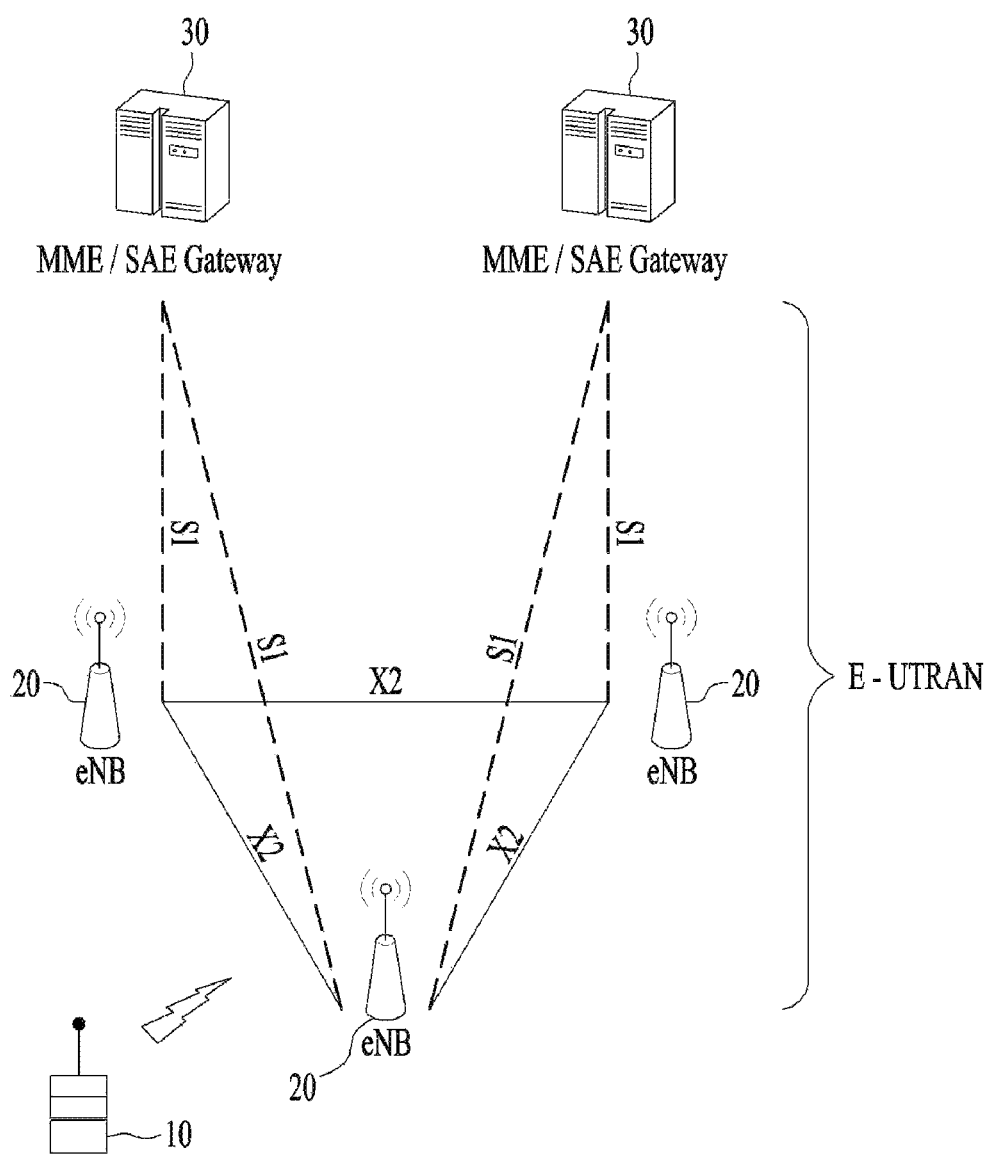
FIG. 1 is a block diagram illustrating network structure of an evolved universal mobile telecommunication system (E-UMTS).
Figure 2:
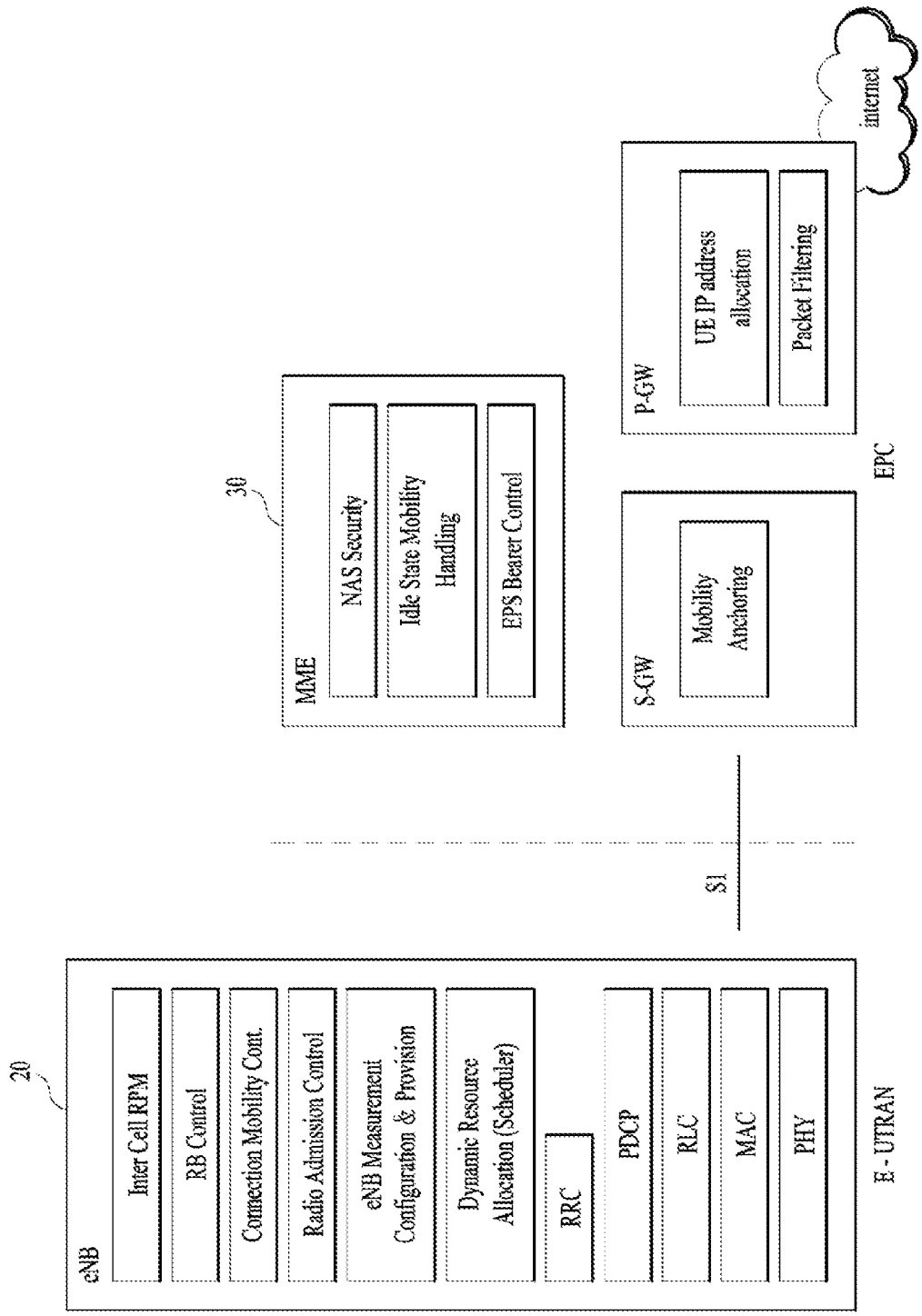
FIG. 2 is a block diagram depicting architecture of a typical E-UTRAN and a typical EPC.
Figure 3:
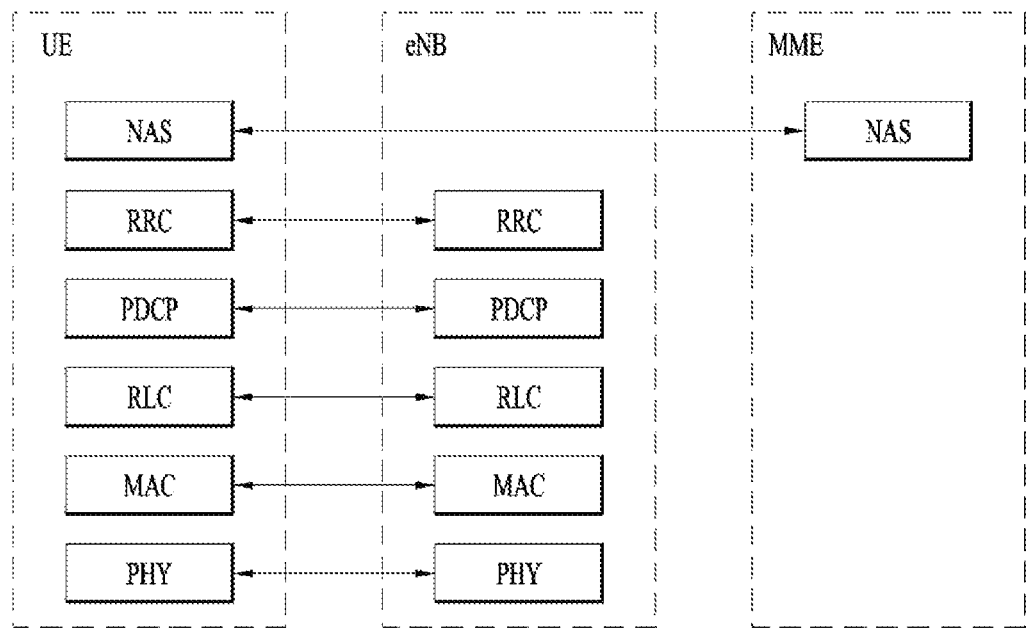
FIG. 3 is a diagram showing a control plane and a user plane of a radio interface protocol between a UE and an E-UTRAN based on a 3GPP radio access network standard.
Figure 3:
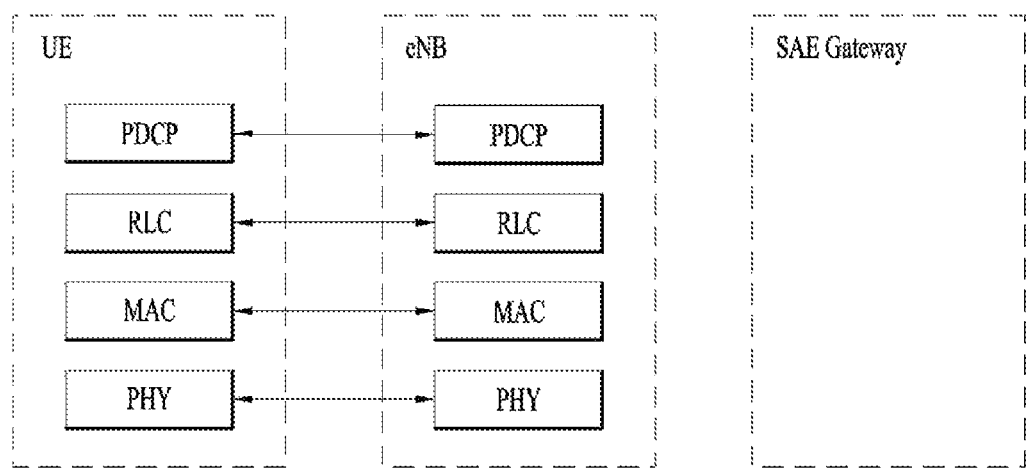

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

Activation/Deactivation of Secondary cell (SCells)

If the MAC entity is configured with one or more SCells, the network may activate and deactivate the configured SCells. The SpCell is always activated. The network activates and deactivates the SCell(s) by sending the Activation/Deactivation MAC control element. Furthermore, the MAC entity maintains a sCellDeactivationTimer timer per configured SCell (except the SCell configured with PUCCH, if any) and deactivates the associated SCell upon its expiry. The same initial timer value applies to each instance of the sCellDeactivationTimer and it is configured by RRC. The configured SCells are initially deactivated upon addition and after a handover. The configured SCG SCells are initially deactivated after a SCG change.

The MAC entity shall for each TTI and for each configured SCell:
    if the MAC entity receives an Activation/Deactivation MAC control element in this TTI activating the SCell, the MAC entity shall in the TTI according to the timing defined in [2]:
    activate the SCell; i.e. apply normal SCell operation including:
    SRS transmissions on the SCell;
    CQI/PMI/RI/PTI/CRI reporting for the SCell;
    PDCCH monitoring on the SCell;
    PDCCH monitoring for the SCell;
    PUCCH transmissions on the SCell, if configured.
    start or restart the sCellDeactivationTimer associated with the SCell;
    trigger PHR according to subclause 5.4.6.
    else, if the MAC entity receives an Activation/Deactivation MAC control element in this TTI deactivating the SCell; or
    if the sCellDeactivationTimer associated with the activated SCell expires in this TTI:
    in the TTI according to the timing defined in [2]:
    deactivate the SCell;
    stop the sCellDeactivationTimer associated with the SCell;
    flush all HARQ buffers associated with the SCell.
    if PDCCH on the activated SCell indicates an uplink grant or downlink assignment; or
    if PDCCH on the Serving Cell scheduling the activated SCell indicates an uplink grant or a downlink assignment for the activated SCell:
    restart the sCellDeactivationTimer associated with the SCell;
    if the SCell is deactivated:
    not transmit SRS on the SCell;
    not report CQI/PMI/RI/PTI/CRI for the SCell;
    not transmit on UL-SCH on the SCell;
    not transmit on RACH on the SCell;
    not monitor the PDCCH on the SCell;
    not monitor the PDCCH for the SCell;
    not transmit PUCCH on the SCell.

HARQ feedback for the MAC PDU containing Activation/Deactivation MAC control element shall not be impacted by PCell, PSCell and PUCCH SCell interruptions due to SCell activation/deactivation [9].

NOTE: When SCell is deactivated, the ongoing Random Access procedure on the SCell, if any, is aborted.

Activation/Deactivation MAC Control Elements

FIG. 4 is a diagram illustrating Activation/Deactivation MAC control element of one octet.

The Activation/Deactivation MAC control element of one octet is identified by a MAC PDU subheader with LCID as specified in Table 1. It has a fixed size and consists of a single octet containing seven C-fields and one R-field. The Activation/Deactivation MAC control element with one octet is defined as follows FIG. 4. Table 1 describes values of LCID for DL-SCH.

TABLE 1

| Index | LCID values |
|---|---|
| 00000 | CCCH |
| 00001-01010 | Identity of the logical channel |
| 01011-10100 | Reserved |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

NOTE:
Both SC-MCCH and SC-MTCH cannot be multiplexed with other logical channels in the same MAC PDU except for Padding and SC-PTM Stop Indication FIG. 5 is a diagram illustrating Activation/Deactivation MAC control element of four octets.

The Activation/Deactivation MAC control element of four octets is identified by a MAC PDU subheader with LCID as specified in table 1. It has a fixed size and consists of a four octets containing 31 C-fields and one R-field. The Activation/Deactivation MAC control element of four octets is defined as follows (FIG. 5).

For the case with no serving cell with a ServCellIndex (index of serving cell) larger than 7, Activation/Deactivation MAC control element of one octet is applied, otherwise Activation/Deactivation MAC control element of four octets is applied.

Ci: if there is an SCell configured with SCellIndex i as specified in [8], this field indicates the activation/deactivation status of the SCell with SCellIndex i, else the MAC entity shall ignore the Ci field. The Ci field is set to "1" to indicate that the SCell with SCellIndex i shall be activated. The Ci field is set to "0" to indicate that the SCell with SCellIndex i shall be deactivated;

–R: Reserved bit, set to "0".

Proposals for Packet Duplication

First issue is whether the packet duplication should be supported in E-UTRAN New Radio-Dual Connectivity (EN-DC). For EN-DC with NR master, the PDCP is a NR PDCP, and the packet duplication is agreed to be supported. However, for EN-DC with LTE master, the PDCP is a LTE PDCP, and we have to discuss whether it can be supported.

For downlink, there is no problem to support this feature, because the LTE PDCP already implements duplication elimination function. As long as the LTE PDCP in the master eNB duplicates PDCP PDUs to LTE RLC and NR RLC, there is no problem to support this feature in the UE side. It's all up to eNB implementation.

However, for uplink, to support packet duplication, the LTE PDCP has to be upgraded in the UE. It might be possible, but we think it is out of the scope of NR WI. This issue can be discussed in other WI such as URLLC.

Proposal1: the present application proposes Packet duplication in LTE PDCP should be discussed in LTE Rel-15 URLLC WI.

Second issue is whether the packet duplication function is mandatory for NR PDCP.

The packet duplication is required only for special cases such as URLLC transmission or during handover. As it is not always required, it does not have to be mandatorily supported. Whether to support packet duplication function should be configured per PDCP depending on radio bearer characteristics.

Proposal2: the present application proposes support for packet duplication function should be configured per radio bearer.

Even if a radio bearer is configured to support packet duplication, the PDCP transmitter does not have to perform packet duplication for all PDCP PDUs. As the packet duplication is useful only at special conditions e.g. bad radio conditions, important packet transmission, etc., it is desirable to perform packet duplication only when it is really needed. The UE may decide to enable/disable packet duplication function by its own, or the gNB may command the UE to turn on/off the duplication function.

Proposal3: the present application proposes, for a radio bearer supporting packet duplicate function, enabling/disabling packet duplication function should be dynamically controlled.

A MAC CE is used for dynamic on/off of packet duplication in PDCP. If the PDCP duplication is turned on, the transmitting PDCP entity duplicates a PDCP PDU, and submits it to two different RLC entities. The two RLC entities are mapped to two different cells in order to avoid transmitting duplicated packets on a single cell. In Carrier Aggregation (CA), it is possible that a SCell can be deactivated when e.g., Activation/Deactivation MAC CE is received with the corresponding Ci field set to 0, or the associated sCellDeactivationTimer is expired. Then, it is questioned how the UE behaves if the UE receives a duplication activation command (e.g., a duplication MAC CE) with duplication=ON when the cell on which the duplicated packet will be transmitted is deactivated.

Proposals according to the present invention may be applied when eNB can't aware of deactivated state of UE.

The present invention proposes that when the UE receives a duplication activation command (e.g., a Duplication MAC CE (Dup MAC CE)) with duplication=ON, the UE applies packet duplication only for Duplicate RBs whose transmission paths have at least one activated cell.

The UE may receive information related to configuration of a Duplicate RB from the eNB (or gNB). The duplicate RB is composed of one PDCP entity and two RLC entities. The duplicate RB may be associated with two RLC entities. The configuration of duplicate RB includes an indication that the RB is able to perform packet duplication. Each RLC entity of the duplicate RB is mapped to a different cell, i.e. the data of two RLC entities are transmitted on different cells.

When the UE receives duplication activation command (e.g., a Duplication MAC CE with duplication=ON) from the eNB via a cell (serving cell), the UE checks for each Duplicate RB whether both transmission paths of the Duplicate RB have at least one activated cell. If each of both transmission paths has at least one activated cell, the UE starts to perform packet duplication in the PDCP entity of the Duplicate RB. In other words, the UE may apply packet duplication for the duplicate RB if each of transmission paths of the duplicate RB is mapped to at least one activated cell. In this case, for applying the packet duplication, a PDCP entity of the duplicate RB duplicates a PDCP Protocol Data Unit (PDCP PDU) and submits the duplicated PDCP PDU to at least two Radio Link Control (RLC) entities associated with at least one activated cell mapped to the duplicate RB. If all cells mapped to one transmission path of the duplicate RB become deactivated, the UE may stop the packet duplication for the duplicate RB.

However, if one of the transmission paths of the Duplicate RB does not have any activated cell, i.e. all cells belonging to one transmission path are deactivated, the UE does not apply packet duplication for the Duplicate RB, i.e. does not perform packet duplication in the PDCP entity of the Duplicate RB. In this case, the PDCP entity of the Duplicate RB transmits the packet to one transmission path where at least one cell is activated. In this case, by a Packet Data Convergence Protocol (PDCP) entity of the duplicate RB submits PDCP PDU to only a specific RLC entity associated with an activated cell mapped to the duplicate RB.

The Duplication MAC CE may indicate a specific Duplicate RB, e.g. via LCID or RB ID included in the Duplication MAC CE. In this case, the UE checks the activation status of cells belonging to the specific Duplicate RB.

As PCell or PSCell is always activated, the invention may be only applied to SCell.

The activation of a cell means normal cell operation is applied, i.e.:

SRS transmissions on the cell;
CQI/PMI/RI/PTI/CRI reporting for the cell;
PDCCH monitoring on the cell;
PDCCH monitoring for the cell;
PUCCH transmissions on the cell, if configured.

When packet duplication is applied for one or more Duplicate RBs, the (transmitting) PDCP entity of each of one or more Duplicate RB duplicates PDCP PDUs, and submits each duplicated PDCP PDU to both RLC entities associated with the PDCP entity.

Figure 6:
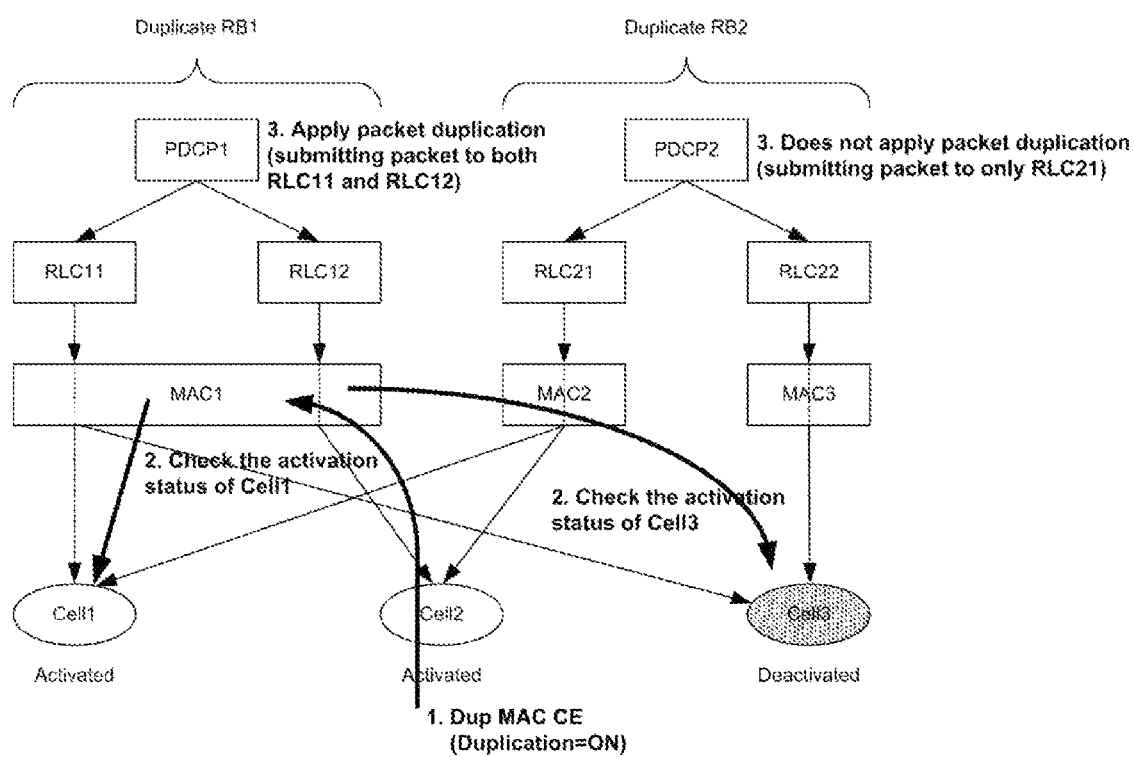
FIG. 6 is a diagram illustrating an example of applying packet duplication depending on cell activation status.

FIG. 6 is a diagram illustrating an example of applying packet duplication depending on cell activation status.

1. The UE may be configured with three cells as an example. In other words, three cells may be configured for the UE as an example. As shown in FIG. 6, cell1 and cell2 are activated, and cell3 is deactivated.

2. The UE may be configured with two duplicate RBs, i.e. Duplicate RB1 and Duplicate RB2. The Duplicate RB1 consists of PDCP1 entity, RLC11 entity, and RLC12 entity, the Duplicate RB2 consists of PDCP2 entity, RLC21 entity, and RLC22 entity. The MAC entity is independent of RBs, i.e. same or different MAC entity can be used for different RBs.

3. The RLC entities are mapped to cells with following relationship. RLC11 entity is mapped to cell1 and cell3, RLC12 entity is mapped to cell2, RLC21 entity is mapped to cell1 and cell2, RLC22 entity is mapped to cell3.

4. As both transmission paths of Duplicate RB1 have at least one activated cell, the PDCP entity of Duplicate RB1 submits a PDCP PDU to either RLC11 entity or RLC12 entity. As one transmission path of Duplicate RB2 does not have at least one activated cell, the PDCP entity of Duplicate RB2 submits a PDCP PDU to only RLC21.

5. The MAC1 entity may receive duplication activation command (e.g., Dup MAC CE with Duplication=ON) via an activated cell, i.e. cell2.

6. The UE checks activation status of cells mapped to Duplicate RBs. The UE figures out that both transmission paths of Duplicate RB1 are available, but one of the transmission paths of Duplicate RB2 is not available.

7. The UE applies packet duplication only for the Duplicate RB1. That is, the PDCP entity of the Duplicate RB1 duplicates a PDCP PDU and submits it to both RLC11 entity and RLC12 entity. The UE does not apply packet duplication for the Duplicate RB2. That is, the PDCP entity of the Duplicate RB2 submits a PDCP PDU only to RLC21 entity.

If one of the cells is deactivated and, as a consequence, one of the transmission paths of a Duplicate RB becomes unavailable, the UE stops performing packet duplication of the Duplicate RB. In other words, the UE performs packet duplication for a duplicate radio bearer (RB). Then, if all cells mapped to one transmission path of the duplicate RB become deactivated, the UE may stop the packet duplication for the duplicate RB.

Figure 7:
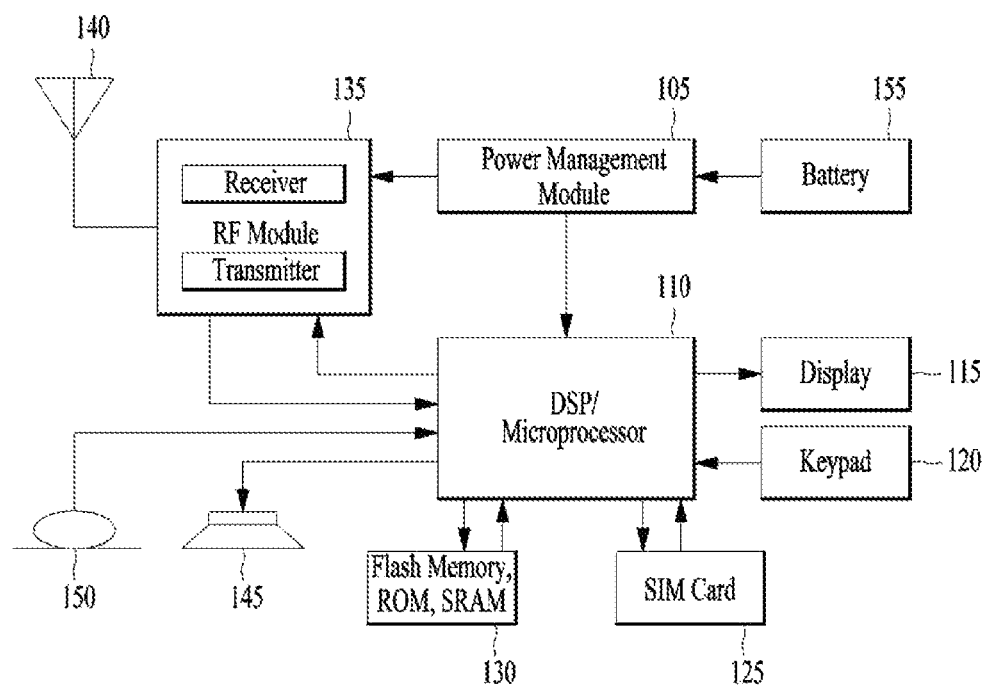
FIG. 7 is a block diagram of an apparatus (e.g., communication apparatus) according to an embodiment of the present invention.

FIG. 7 is a block diagram of an apparatus (e.g., communication apparatus) according to an embodiment of the present invention.

The apparatus shown in FIG. 7 can be a user equipment (UE) and/or eNB adapted to perform the above mechanism, but it can be any apparatus for performing the same operation.

As shown in FIG. 7, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 7 may represent a UE comprising a receiver (135) configured to receive signal from the network, and a transmitter (135) configured to transmit signals to the network. The receiver and transmitter can constitute the transceiver (135). The UE further comprises a processor (110) connected to the transceiver (135: receiver and transmitter).

Also, FIG. 7 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Apparatus and method for performing cell activation are applicable to a variety of wireless communication systems, e.g. 3GPP LTE/LTE-A, 5G, etc.

What is claimed is:

1. A method for a user equipment (UE) performing packet duplication, the method comprising:
receiving a duplication activation command for a duplicate radio bearer (RB); and
checking whether both of transmission paths of the duplicate RB are mapped to at least one activated cell;
applying the packet duplication for the duplicate RB based on both of the transmission paths of the duplicate RB is mapped to at least one activated cell; and
stopping the packet duplication for the duplicate RB based on one of the transmission paths of the duplicate RB not being mapped to at least one activated cell,
wherein the duplicate RB is associated with a Packet Data Convergence Protocol (PDCP) entity and two Radio Link Control (RLC) entities,
wherein each of the two RLC entities is mapped to a different cell, and
wherein the PDCP entity of the duplicate RB transmits a packet to another transmission path where at least one cell is activated based on one of the transmission paths of the duplicate RB not being mapped to at least one activated cell.

2. The method of claim 1, wherein:
based on all cells belonging to one of the transmission paths of the duplicate RB being deactivated, the UE does not apply the packet duplication for the duplicate RB.

3. The method of claim 1, wherein the applying comprises:
duplicating, by the PDCP entity of the duplicate RB, a PDCP Protocol Data Unit (PDCP PDU); and
submitting, by the PDCP entity of the duplicate RB, the duplicated PDCP PDU to the two RLC entities associated with at least one activated cell mapped to the duplicate RB.

4. The method of claim 1, further comprising:
submitting, by the PDCP entity of the duplicate RB, a PDCP PDU to only a specific RLC entity associated with an activated cell mapped to the duplicate RB based on one of transmission paths of the duplicate RB not being mapped to at least one activated cell.

5. A user equipment (UE) for performing packet duplication, the UE comprising:
a receiver configured to receive a duplication activation command for a duplicate radio bearer (RB); and
a processor configured to:
check whether both of transmission paths of the duplicate RB are mapped to at least one activated cell;
apply the packet duplication for the duplicate RB both of the transmission paths of the duplicate RB being mapped to at least one activated cell; and
stop the packet duplication for the duplicate RB based on one of the transmission paths of the duplicate RB not being mapped to at least one activated cell,
wherein the duplicate RB is associated with a Packet Data Convergence Protocol (PDCP) entity and two Radio Link Control (RLC) entities,
wherein each of the two RLC entities is mapped to a different cell, and
wherein the PDCP entity of the duplicate RB transmits a packet to another transmission path where at least one cell is activated based on one of the transmission paths of the duplicate RB not being mapped to at least one activated cell.

6. The UE of claim 5, wherein based on all cells belonging to one of the transmission paths of the duplicate RB being deactivated, the processor is configured not to apply the packet duplication for the duplicate RB.

7. The UE of claim 5, wherein for the applying, the processor is configured to control:
duplicate, by the PDCP entity of the duplicate RB, a PDCP Protocol Data Unit (PDCP PDU); and
submit, by the PDCP entity of the duplicate RB, the duplicated PDCP PDU to the two RLC entities associated with at least one activated cell mapped to the duplicate RB.

8. The UE of claim 6, wherein the processor is configured to control:
submitting, by the PDCP entity of the duplicate RB, a PDCP PDU to only a specific RLC entity associated with an activated cell mapped to the duplicate RB based on one of transmission paths of the duplicate RB not being mapped to at least one activated cell.

* * * * *